United States Patent [19]

Shannon et al.

[11] Patent Number: 5,242,598
[45] Date of Patent: Sep. 7, 1993

[54] SOLID PHASE EXTRACTION

[75] Inventors: Michael J. R. Shannon, Plainsboro, N.J.; Burt D. Ensley, Newtown, Pa.

[73] Assignee: Envirogen, Inc., Lawrenceville, N.J.

[21] Appl. No.: 936,795

[22] Filed: Aug. 28, 1992

Related U.S. Application Data

[63] Continuation-in-part of Ser. No. 744,902, Aug. 14, 1991, abandoned.

[51] Int. Cl.$^5$ .................. B01D 11/02; B01D 11/00; B01D 15/00; B08B 7/04
[52] U.S. Cl. ..................... 210/690; 210/692; 210/747; 210/908; 210/909; 210/924; 134/7; 134/25.1; 134/42; 405/128; 196/14.52; 209/5; 209/173
[58] Field of Search .................. 134/6, 7, 25.1, 20, 134/42; 209/5, 9, 172, 172.5, 173; 196/14.52; 405/128, 129; 208/425, 428; 210/747, 691, 692, 693, 908, 909, 690, 924

[56] References Cited

U.S. PATENT DOCUMENTS

| | | | |
|---|---|---|---|
| 3,224,582 | 12/1965 | Iannicelli | 209/166 |
| 3,494,862 | 2/1970 | Horowitz | 210/924 |
| 3,567,660 | 3/1971 | Winkler | 210/693 |
| 3,657,125 | 4/1972 | Strickman | 210/693 |
| 3,756,948 | 9/1973 | Weinberg | 210/693 |
| 3,862,963 | 1/1975 | Hoshi | 210/924 |
| 3,888,766 | 6/1975 | DeYoung | 210/693 |
| 3,917,528 | 11/1975 | Orban | 134/6 |
| 3,929,631 | 12/1975 | Winkler | 210/693 |
| 3,960,722 | 6/1976 | Tomikawa | 210/693 |
| 4,011,159 | 3/1977 | Stein | 134/7 |
| 4,042,498 | 8/1977 | Kennedy | 210/909 |
| 4,066,539 | 1/1978 | Hachisu | 210/693 |
| 4,082,660 | 4/1978 | Papiser | 210/693 |
| 4,383,868 | 5/1983 | Braley | 134/7 |
| 4,395,336 | 7/1983 | Eng | 210/693 |
| 4,435,346 | 3/1984 | Ito | |
| 4,483,716 | 11/1984 | Heller | 134/7 |
| 4,492,001 | 1/1985 | Hedrenius | 134/7 |
| 4,623,464 | 11/1986 | Ying | 210/909 |
| 4,832,852 | 5/1989 | Wells | 210/693 |
| 4,894,166 | 1/1990 | Pitts | |
| 5,019,245 | 5/1991 | Ignasiak | 134/25.1 |
| 5,055,196 | 10/1991 | Darian | 210/909 |
| 5,071,565 | 12/1991 | Fritz | 210/909 |

FOREIGN PATENT DOCUMENTS

| | | | |
|---|---|---|---|
| 7214191 | 10/1971 | Netherlands | 210/693 |
| 2342 | 7/1982 | PCT Int'l Appl. | 210/690 |
| 2211496 | 10/1987 | United Kingdom . | |

OTHER PUBLICATIONS

Evaluation of 14 Charcoal-Polyurethane Foam Mixtures for the Separation of Mirex and Photomirex from Aroclor 1254, by Ludwig J. Babjak and Alfred S. Y. Chau, Babjak & Chau: J. Assoc. Off. Anal. Chem (vol. 62, No. 5, 1979), pp. 1174–1176.
Column Chromatographic Determination of Mirex, Photomirex, and Polychlorinated Biphenyls in Lake Sediments, by Alfred S. Y. Chau and Ludwig J. Babjak, Chau & Babjak: J. Assoc. Off. Anal. Chem. (vol. 62, No. 1, 1979) pp. 107–113.
Field Air Sampling of Pesticide Vapors with Polyurethane Foam, by Benjamin C. Turner and Dwight E. Glotfelty, Analytical Chemistry, vol. 49, No. 1, Jan. 1977, pp. 7–10.
Brochure—"Reusable Scumball" under U.S. Pat. No. 4,894,166 3 pages.
Modified Polyurethane Carriers for Biochemical Waste Water Treatment, by Imre Pascik, Wat. Sci. Tech. vol. 22, No. 1/2, pp. 33–42, 1990.
Absorption by Polyurethane Foams; New Method of Separation, by H. J. M. Bowen, J. Chem. Soc. (A), 1970 pp. 1082–1085.

*Primary Examiner*—Thomas M. Lithgow
*Attorney, Agent, or Firm*—Mathews, Woodbridge & Collins

[57] ABSTRACT

Hydrophobic contaminants are removed from a particulate matter by contacting the particulate matter with a solid organic phase. The hydrophobic contaminants have greater affinity for the solid organic phase than for the particulate matter and repartition to the solid organic phase. The solid organic phase is then separated from the particulate matter. A typical embodiment utilizes polystyrene particles to remove polychlorinated biphenyls from soil.

14 Claims, No Drawings

SOLID PHASE EXTRACTION

This application is a continuation-in-part of Ser. No. 07/744,902 filed Aug. 14, 1991, now abandoned.

The present invention pertains to solid phase extraction. Solid phase extraction is a method of removing hydrophobic contaminants from particulate matter using a solid organic phase.

The existence of chemical contamination in the environment is well documented. Hazardous or noxious compounds from both industrial or agricultural activities have found their way into landfills, waterways, etc. over the course of time through purposeful disposal or accidental discharge. Recent acknowledgement of the health and environmental risks of such contamination has led to a search for a solution which is both technically and economically feasible.

Many of the particularly problematic contaminants in the environment are hydrophobic in nature. Typical hydrophobic contaminants include aromatic hydrocarbons, polyaromatic hydrocarbons, polychlorinated biphenyls, dioxin, long chain alkanes, or mixtures thereof. Examples of aromatic hydrocarbons are benzene, toluene, and the like. Polyaromatic hydrocarbons include naphthalene, anthracene, and the like. Polychlorinated biphenyls (PCBs) are compounds having the formula $C_{12}H_{10-n}X_n$, wherein X is a chlorine atom and n is greater than one and typically is five to six. Examples of long chain alkanes include natural gasoline (typically $C_6$–$C_{12}$), kerosene (typically $C_{12}$–$C_{18}$), gas oils, such as furnace and diesel oils (typically above $C_{18}$), and lubricating oils (typically $C_{20}$–$C_{30}$).

The present invention relates to a method of removing hydrophobic contaminants from a particulate matter which involves the steps of (a) contacting the particulate matter with a solid organic phase, the hydrophobic contaminants having greater affinity for the solid organic phase than for the particulate matter sufficient to cause the contaminants to repartition from the particulate matter to the solid organic phase, and (b) separating the solid organic phase from the particulate matter. The above method, hereinafter "solid phase extraction," provides for the removal and concentration of hydrophobic contaminants from the particulate matter to an easily recoverable solid organic phase.

Solid phase extraction is particularly applicable when the particulate matter is soil, sediment or a fraction thereof, for example, pebbles (particles with diameters greater than 2 mm), sand (particles with diameters from about 0.02 to about 2 mm), silt and clay (particles with diameters less than 0.02 mm). This method is particularly suited for on site application since soil which is contaminated can be treated by this method either with or without costly excavation.

The first step of this method is to contact the particulate matter which is contaminated with a solid organic phase. The solid organic phase is such that the hydrophobic contaminants have a greater affinity for the solid organic phase than the particulate matter. The greater affinity or attraction of the hydrophobic contaminants for the solid organic phase is sufficient if it causes the hydrophobic contaminants to repartition from the particulate matter to the solid organic phase. Suitable solid organic phases include polymeric foams and rubber. Polymeric foams are preferred. The polymeric foams include polyurethane, polypropylene, polyethylene, polystyrene, natural rubber, synthetic rubber, and the like. A substance which expands upon solidification of the precursor can be incorporated into the liquid form of the foam precursor, to effect foaming. Examples of typical polymeric foams are polyurethane, polystyrene and polyethylene. Polystyrene is preferred.

One benefit of the present method is the ability to make use of or "recycle" refuse such as discarded rubber tires or other discarded rubber products, discarded polymeric foam materials, etc. as the solid organic phase. As well as providing a use for materials otherwise considered "trash," the use of recycled materials for the solid organic phase makes solid phase extraction even more economical.

The solid organic phase may take on many forms, shapes and sizes. For example, the solid organic phase can be in the form of a sheet, coating or surface, or can be block-shaped, rod-shaped, cube-shaped, sphere-shaped, or randomly shaped. One embodiment of the present method uses solid organic phase in particulate form. Preferred is the use of a solid organic phase of a shape which maximizes surface area to volume ratio.

The contact between the particulate matter and the solid organic phase must be sufficient to cause the hydrophobic contaminants to repartition from the particulate matter to the solid organic phase. The amount of contact between the particulate matter and the solid organic phase, and thus the degree of repartitioning of the contaminants from the particulate matter to the solid organic phase, are affected by several factors.

Clearly, the time of contact is one such factor. The longer the time of contact between the particulate matter and the solid organic phase, the larger the amount of contaminants which repartition into the solid organic phase until equilibrium is reached. Extended time of contact should particularly be considered if the desire is to merely leave the particulate matter in contact with the solid organic phase and rely on the natural flux of the hydrophobic contaminants for repartitioning without more, i.e., without mechanical assistance or other means of contact enhancement.

The contact between the particulate matter and the solid organic phase and thus the repartitioning of the hydrophobic contaminants also can be enhanced by mechanical means such as mixing, stirring or tumbling. Such mechanical methods effectively increase the amount of particulate matter which is contacted by the solid organic phase, providing for more thorough and intimate contact between the two materials.

Another way to facilitate the repartitioning of the hydrophobic contaminants from the particulate matter to the solid organic phase, particularly when shorter contact times are used, is by pretreating the particulate matter with a solvent for the contaminants, preferably an organic solvent. Extended residence times often cause hydrophobic contaminants to partition thoroughly into particulate matter. It is believed that pretreatment of the particulate matter with a solvent and the solvent's subsequent evaporation effects desorption of the hydrophobic contaminant from the particulate matter, thereby enhancing its ability to repartition. The amount of solvent used for pretreatment is from about 20% to about 90%, preferably 50%, by weight of the particulate matter requiring treatment. The solvent can be water-miscible or water-immiscible. Suitable solvents for use in pretreatment include ketones, alkanols, ethers, and alkanes, as for example, acetone, methanol, diethylene, and the like.

In some instances, the solvent may have an undesirable effect on the physical consistency of the solid organic phase, particularly when the solid phase is polystyrene. This can be readily addressed by adding water to the particulate matter and solvent mixture prior to adding the solid organic phase. The amount of water added should be an amount sufficient to reduce changes in the physical consistency of the solid phase without significantly reducing the ability of the solvent to enhance the partitioning of the hydrophobic contaminants. Generally, the amount of water added should be sufficient to reduce the volume of the solvent in the liquid phase to 60% or less when the process is conducted at room temperature.

Since, as discussed above, various factors affect the sufficiency of the contact and the resultant ability of the hydrophobic contaminants to repartition from the particulate matter to the solid organic phase, and since different particulate matter derived from different sources possess different characteristics and different types and levels of contamination, one desiring to use this method to remove hydrophobic contaminants will have to determine, by means of testing samples, the conditions and time for sufficient contact for the desired amount of removal/repartitioning to occur. The sampling, testing, and extrapolation of the results is conducted by conventional means known to those skilled in the art.

Typically, the weight ratio of solid organic phase to particulate matter is from about 1:5 to about 1:100. Higher or lower ratios can be used depending on the degree of contamination and the reduction in contamination desired. For example, with high levels of contamination, (e.g., contamination in the range of 1,000–10,000 ppm) one can employ lower ratios such as 1:1.

The second step in the solid phase extraction method involves the separation of the solid organic phase (to which the hydrophobic contaminants have partitioned) from the particulate matter. The separation step of the present method depends upon the form of the solid organic phase used in the repartitioning step. For example, if the solid organic phase is attached to a removal means, the removal means including, for example, string, rope, wire, and the like, separation can be accomplished by simply lifting the solid organic phase from the particulate matter by pulling the removal means. The particulate matter can be raked to rake out the solid phase, or passed through a sieve with openings sufficiently small to permit the passage of the particulate matter, but prevent the passage of the solid organic phase. When the solid organic phase is in particulate form, depending upon the composition of the solid organic phase, selective flotation alternatively can be employed.

Selective flotation is a method of removal which takes advantage of differences in density between the solid organic phase and the particulate matter. Selective flotation is particularly useful when the solid organic phase is a polymeric foam. When a polymeric foam is used as the solid organic phase, it is possible to separate the solid organic phase after the first step is completed by flooding the particulate matter with water. While the particulate matter is too dense to float, the polymeric foam solid organic phase will float to the top of the flooded particulate matter where it can be scooped or skimmed off.

After the solid organic phase is separated from the particulate matter, the solid organic phase optionally can be disposed of or treated and recycled for subsequent solid phase extraction use by any conventional environmentally-acceptable method. Such methods include, for example, incineration of the spent polymeric foam (resulting in little ash due to the organic nature of the solid phase) as a means of disposal, and chemical or biological remediation in order to recycle the solid organic phase for future use.

The following examples are provided to illustrate the nature of the present invention and are not to be construed as limiting the scope thereof, which scope is specifically defined in the appended claims.

EXAMPLE 1

2,000 parts by weight of soil contaminated with polychlorinated biphenyls is placed in a vessel with 70 parts by weight of rubber particles (from old car tires). The vessel holding the above materials is then tumbled for approximately 30 hours. The rubber particles are separated from the soil by sieving the contents of the vessel.

EXAMPLE 2

2,000 parts by weight of soil contaminated with polychlorinated biphenyls and other hydrophobic contaminants is placed in a vessel. To pretreat the soil, 500 parts by weight of acetone is added to the vessel, which then is shaken for 24 hours. Then 70 parts by weight of polystyrene foam beads (approximately 3 mm in diameter) are added and the vessel is shaken for an additional 6 hours. The acetone is then removed by evaporation, and the remaining contents are shaken for an additional 24 hours. The polystyrene foam beads are separated from the soil by sieving the contents of the vessel.

EXAMPLE 3

2,000 parts by weight of soil contaminated with polychlorinated biphenyls is pretreated in a container with 500 parts by weight of acetone. The resultant mixture is tumbled or shaken for 24 hours. Then 70 parts by weight of rubber particles from old car tires is added to the container along with 2 parts by weight of water to facilitate mixing. The container is tumbled or shaken for 6 hours. The acetone is then removed by evaporation, and an additional 2 parts by weight of water is added to the container, again to facilitate mixing. The contents of the container are tumbled or shaken for another 24 hours. The rubber particles are separated from the soil by sieving.

EXAMPLE 4

The soil in a lot contaminated with a variety of hydrophobic contaminants, including polychlorinated biphenyls, is turned and loosened using conventional farming equipment, while beads of polystyrene foam are deposited and mixed into the soil. The beads are allowed to remain in the soil for 60 days, during which time the soil is turned weekly. After the 60 days, the soil is again turned and the beads are separated from the soil by selective flotation, i.e., flooding the soil with water causing the beads to rise to the surface, and then skimming the floating beads off the surface of the water.

EXAMPLE 5

2,000 parts by weight of soil contaminated with polychlorinated biphenyls is placed in a vessel with 70 parts by weight of rubber particles (from old ca tires) and 500 parts by weight of acetone. The vessel holding the above materials is then tumbled for approximately 15 hours after which time the acetone is removed by evaporation. The rubber particles are separated from the soil by sieving the contents of the vessel.

EXAMPLE 6

2000 parts by weight of soil that is contaminated with polychlorinated biphenyls and other hydrophobic contaminants is mechanically crushed to sand-sized particles. The soil is then placed in a vessel. To pretreat the soil, 500 parts by weight of acetone is added to the vessel, which then is mixed for up to 6 hours. A sufficient amount of water is added at this point to ensure that the volume of acetone in the liquid phase is less than 60%. 70 parts by weight of polystyrene foam beads (approximately 3 mm in diameter) are added and the contents of the vessel are mixed for an additional 6 hours. The acetone is removed by evaporation, and the remaining contents are mixed for up to 16 hours. The polystyrene foam beads are separated from the soil by selective flotation, i.e., flooding the soil with water causing the beads to rise to the surface, and skimming the floating beads from the surface of the water.

EXAMPLE 7

2,000 parts by weight of soil contaminated with polychlorinated biphenyls is mixed in a container with 500 parts by weight of acetone. The resultant mixture is tumbled or mixed for up to 6 hours. 70 parts by weight of rubber particles from old car tires is added to the container along with 2 parts by weight of water to facilitate mixing. The container is tumbled or shaken for 6 hours. The acetone is removed by evaporation, and an additional 2 parts by weight of water is added to the container, again to facilitate mixing. The contents of the container are tumbled or shaken for up to 16 hours. The rubber particles are separated from the soil by sieving.

EXAMPLE 8

Sandy soils (2g) that have been contaminated with a PCB mixture for several years (initial concentration of contamination =300 μg PCB/g soil) are treated with polystyrene beads in three different ways:

1. 2g soil is mixed with 1 ml acetone for 12 hours. The mixture then is amended with 3 ml H$_2$O. 60 mg of polystyrene foam beads are added to the mixture which then is mixed for another 6 hours before the acetone is removed by evaporation. The remaining soil/water/bead mixture is mixed for a final 48 hours to ensure that repartitioning of PCB to the beads will be complete.

2. 2g soil is treated as above but without adding acetone.

3. 2g soil is treated as in #2 (without acetone), but the final mixing of the soil, water, and beads proceeds for up to 2 weeks instead of only 48 hours.

At the completion of the final mixing stage, the beads are separated from the treated soil and the two fractions are analyzed for PCB content. The results are shown in Table 1.

TABLE 1

| Treatment & SPA Quantity[1] | PCB PARTITIONING (%) | |
| --- | --- | --- |
| | To Polystyrene | Remaining in Soil |
| Acetone in premix step, 24 hr for final mix step | | |
| 1 mg | 29.7 | 70.3 |
| 10 mg | 58.1 | 41.9 |
| 40 mg | 74.6 | 25.4 |
| 80 mg | 62.0 | 38.0 |
| No acetone in premix step, 24 hr for final mix step | | |
| 1 mg | 1.4 | 98.6 |
| 10 mg | 16.0 | 84.0 |
| 40 mg | 23.7 | 76.3 |
| 80 mg | 28.7 | 71.3 |
| No acetone in premix, prolonged final mix step (2 weeks) | | |
| 1 mg | 6.4 | 93.6 |
| 10 mg | 20.4 | 79.6 |
| 40 mg | 42.3 | 57.7 |
| 80 mg | 20.3 | 79.7 |

[1]SPA refers to the Solid Phase Agent, polystyrene.

Thus there is an increased rate of repartitioning of polychlorinated biphenyls to the solid organic phase when a solvent is used in the process as compared to the rate of repartitioning in the absence of solvent, even when mixing times are prolonged.

EXAMPLE 9

The order of the process steps are altered as follows to determine the effect of such on the repartitioning of the hydrophobic contaminants from soil to the solid organic phase.

Process #1
Steps:
1. soil+solvent
2. water added
3. solvent removed
4. solid organic phase added
5. solid phase separated from soil Process #2
Steps:
1. soil+solvent
2. water added
3. solid organic phase added
4. solvent removed
5. solid phase separated from soil The results are presented in Table 2.

TABLE 2

| Solvent | PCB REMOVAL (%) | |
| --- | --- | --- |
| | Process #1 | Process #2 |
| Methanol | 54.8 | 58.1 |
| Acetone | 65.8 | 97.5 |
| Dioxane | 89.5 | 96.2 |
| Ether/methanol | 56.2 | 93.7 |
| Ether/acetone | 55.6 | 80.7 |

Table 2 shows that removal of the solvent after the solid organic phase is added enhances PCB removal.

What is claimed is:

1. A method of removing a hydrophobic aromatic contaminant from soil or sediment which comprises:
    (a) contacting the soil or sediment with from about 20% to about 90%, by weight of the soil or sediment, of an organic solvent;
    (b) adding from 1:1 to 1:100 parts by weight of particulate polystyrene foam to the soil or sediment;
    (c) partitioning the hydrophobic aromatic contaminant between the soil or sediment and the particulate polystyrene foam by (i) mixing the particulate polystyrene foam and the soil or sediment and (ii) removing the solvent; and (d) separating the soil or sediment from the particulate polystyrene foam.

2. The method of claim wherein the hydrophobic aromatic contaminant is a polyaromatic hydrocarbon.

3. The method of claim 1 wherein the hydrophobic aromatic contaminant is a polychlorinated biphenyl.

4. The method of claim 1 wherein the hydrophobic aromatic contaminant is a dioxin.

5. The method of claim 1 wherein the soil or sediment is contacted with about 50%, by weight of the soil or sediment, of an organic solvent.

6. The method of claim 1 wherein the organic solvent is methanol or acetone.

7. The method of claim 1 wherein the soil or sediment is separated from the particulate polystyrene foam by flotation in an aqueous medium.

8. A method of removing a hydrophobic aromatic contaminant from soil or sediment which comprises:
   (a) contacting the soil or sediment with from about 20% to about 90%, by weight of the soil or sediment, of an organic solvent;
   (b) adding from 1:1 to 1:100 parts by weight of rubber tire chips to the soil or sediment;
   (c) partitioning the hydrophobic aromatic contaminant between the soil or sediment and the rubber tire chips by (i) mixing the rubber tire chips and the soil or sediment and (ii) removing the solvent; and
   (d) separating the soil or sediment from the rubber tire chips.

9. The method of claim 8 wherein the hydrophobic aromatic contaminant is a polyaromatic hydrocarbon.

10. The method of claim wherein the hydrophobic aromatic contaminant is a polychlorinated biphenyl.

11. The method of claim 8 wherein the hydrophobic aromatic contaminant is a dioxin.

12. The method of claim 8 wherein the soil or sediment is contacted with about 50%, by weight of the soil or sediment, of an organic solvent.

13. The method of claim 8 wherein the organic solvent is methanol or acetone.

14. The method of claim 1 further comprising the step of adding an amount of water to the soil or sediment and organic solvent prior to adding the particulate polystyrene foam, wherein the amount of water added is sufficient to reduce changes in the physical consistency of the particulate polystyrene foam without significantly reducing the ability of the organic solvent to enhance the partitioning of the hydrophobic aromatic contaminant from the soil or sediment to the particulate polystyrene foam.

* * * * *